A. BUTTRICK.

Paddle Wheel.

No. 40,009.

Patented Sept. 22, 1863.

Witnesses
J. W. Coombs
G. W. Reed

Inventor
A. Buttrick
per Munn & Co
attys

UNITED STATES PATENT OFFICE.

ALVARO BUTTRICK, OF CHELSEA, VERMONT.

IMPROVED FEATHERING PADDLE-WHEEL.

Specification forming part of Letters Patent No. 40,009, dated September 22, 1863.

*To all whom it may concern:*

Be it known that I, ALVARO BUTTRICK, of Chelsea, in the county of Orange and State of Vermont, have invented a new and useful Improvement in Feathering Paddle-Wheels; and I do hereby declare that the following is a full, clear, and exact description of the same, reference being had to the accompanying drawings, forming part of this specification, in which—

Figure 1:
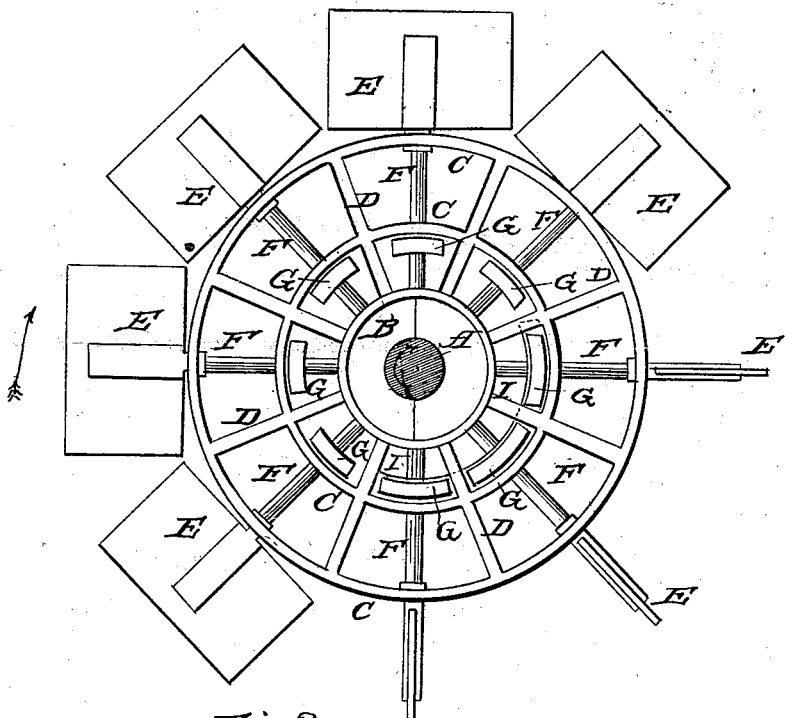
Figure 2:
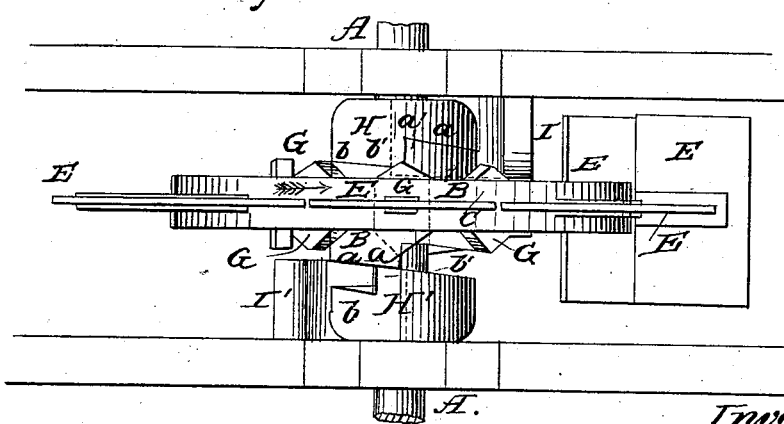

Figure 1 is a side view of a paddle-wheel with my improvement. Fig. 2 is a top view of the same.

Similar letters of reference indicate corresponding parts in both figures.

This invention relates to that class of feathering paddle-wheels the floats of which are arranged to turn about axes perpendicular, or nearly so, to the axis of the shaft of the wheel for the purpose of presenting the blades flatwise to the water during a portion of each revolution of the wheel and edgewise during the remainder of the revolution.

It consists in certain improved means of producing the above-mentioned feathering movement, which is operative in whichever direction the wheel rotates, and which varies the said movement to suit the reversal of the rotation of the wheel.

To enable others skilled in the art to make and use my invention, I will proceed to describe its construction and operation.

A is the shaft of the wheel, B is the hub, and C C are the rings attached to the hub by means of rigid arms D D. E E are the floats, rigidly secured to arms or spindles F F, which are arranged radially to the shaft A and fitted to turn in bearings in the hub B and rings C C'. The floats are so attached to the spindles that they present a rather larger area of surface on one side than on the other side of the axes of their respective spindles, in order that when moved through the water by the revolution of the wheel, and not held in such manner as to present their faces parallel with the shaft, or in the direction of its revolution, they may be turned to present their edges by the greater pressure of the water on the larger areas on one side of the axes of their respective spindles, and each spindle has secured upon it a cam, G, two opposite sides of which are more prominent than the other two. As shown in Fig. 2, the said prominent sides correspond with the faces of the paddle-floats. The hub B, which is fitted loosely to the shaft, so as to be capable of both turning and moving longitudinally therein, has two similar spiral-faced projections, $a$ $a$, on each side, each extending half-way round and terminating abruptly to form portions of two clutches, the other portions, H H', of which having corresponding spiral-faced projections $b$ $b$, are secured firmly upon the shaft, the distance between the faces of H H' being such that the hub may be permitted to make nearly a whole revolution on the shaft, and the longitudinal movement, which is caused by the movement of the faces of the projections $a$ $a$ between those $b$ $b$, any further revolution being prevented by the meeting of the abrupt terminations $a'$ $b'$ of the said projections, which, coming in contact, cause the shaft to carry the wheel with it in whichever direction it is caused to rotate by the engine.

I I' are two stationary guides arranged on opposite sides of the wheel and secured to the vessel in any suitable manner. These guides are each in the form of a portion of a circle greater than a quadrant, and are concentric with the paddle-shaft, and their faces opposite to the sides of the wheel are planes perpendicular to the axis of the wheel and its shaft, but their ends are rounded off, and the distance between the planes of the said faces is such that they may produce the operation of the cams G G in the following manner:

When the shaft A rotates in the direction of the arrow shown upon it in Fig. 1, the abrupt terminations $b'$ of the two projections $b$ on the clutch H coming in contact with the corresponding abrupt terminations $a'$ of the projections $a$ on the hub of the wheel cause the wheel to rotate with the shaft, and when each paddle-float in its revolution approaches the position in which it is desired to commence to act upon the water one of the two more prominent sides of its respective cam G comes into contact with the rounded end of the guide I, and by the continued revolution of the said wheel is caused to be turned to the extent of one-quarter revolution, and its respective spindle F, turning with it, turns the float from a position in which its edge has been presented to the water to a position in which its face is presented, and, as the cam continues to rotate with one of its less prominent sides in contact with the guide, the said cam and its spindle and float are prevented from turning farther, and the float is caused to act upon the water with a propulsive effect; but as soon as the cam passes the guide the resistance of the water acting upon the larger area of the face of the float on one side of the axis of its spindle F causes the float to present itself edgewise to the water till it again comes in contact with the guide, when it is turned another quarter of a revolution, and thereby brought to a position in which it again acts with propulsive effect, the proportion of the revolution in which it is active depending on the length of the guide I. In this operation the guide I' is inoperative, the cams G G not coming in contact with it; but when the revolution of the paddle-shaft is reversed the shaft first makes nearly a whole revolution without the wheel, and in so doing causes the oblique faces of the projections b b of the clutch H so to act upon the corresponding faces a a on the hub as to move the hub and wheel upon the shaft toward the clutch H' until the abrupt terminations b on the latter hub come in contact with the corresponding terminations a' of the projections a on the hub when the wheel commences to rotate with the shaft, and while the wheel rotates in this direction the cam works clear of the guide I, but are acted upon by the guide I' in the same manner in which they were acted upon by the guide I in rotating in the opposite direction, causing the feathering of the paddles in the same manner.

The wheel, constructed and operating in combination with the guides I I', as above described, may be either wholly or partly submerged.

What I claim as my invention, and desire to secure by Letters Patent, is—

The arrangement of the spiral-faced movable self-adjusting hub B, spindles F, and floats E, with the spiral clutches H H', cams G, and guides I I', all operating in the manner herein shown and described.

ALVARO BUTTRICK.

Witnesses:
JOHN W. SMITH,
ELIHU HYDE.